United States Patent [19]

Smithlin

[11] 4,292,626
[45] Sep. 29, 1981

[54] MANCHESTER DECODER

[75] Inventor: John R. Smithlin, North Hollywood, Calif.

[73] Assignee: Her Majesty the Queen in right of Canada, as represented by the Minister of National Defence, Ottawa, Canada

[21] Appl. No.: 69,213

[22] Filed: Aug. 23, 1979

[51] Int. Cl.$^2$ .......................................... H03K 13/24
[52] U.S. Cl. ............................................ 340/347 DD
[58] Field of Search ................... 340/347 DD; 364/42; 375/55

[56] References Cited

U.S. PATENT DOCUMENTS

| | | | |
|---|---|---|---|
| 3,514,706 | 5/1970 | Dupraz | 340/347 DD |
| 3,659,286 | 4/1972 | Perkins | 340/347 DD |
| 3,810,233 | 5/1974 | Besenfelder | 360/42 |
| 3,947,876 | 3/1976 | Gray | 360/42 |
| 3,979,746 | 9/1976 | Jarrett | 340/347 DD |

OTHER PUBLICATIONS

Gindi "IBM Technical Disclosure Bulletin", vol. 9, No. 4, Sep. 1966, pp. 378-379.

Primary Examiner—Charles D. Miller
Attorney, Agent, or Firm—Alan H. Levine

[57] ABSTRACT

A circuit for decoding a Manchester coded signal into a NRZ coded signal and the associated synchronizing clock, comprising means for sensing the direction of base line crossing of the Manchester coded signal at a time central of each of its bit periods, and means for establishing the logic level of the NRZ signal pulse depending on the direction of the aforenoted base line crossing.

5 Claims, 8 Drawing Figures

{
}
MANCHESTER DECODER

BACKGROUND

This invention relates to the field of digital signal decoding, and particularly to a circuit for decoding a Manchester coded signal to an NRZ coded signal.

Manchester coded digital signals have been widely used in areospace flight testing instrumentation and digital tape recording, since a wide bandwidth is not required, nor is a near DC response required as is the case for recording and translation of NRZ coded signals.

Due to the often difficult environments in which the Manchester coded signals are used, signal translation circuitry usually requires adjustable components which are maintained in the field since the signals are often distorted. Since the signals are modified by different distortion in various environments, standard signal translation circuitry without adjustable components has been difficult and/or expensive to design.

The present invention, on the other hand, is a circuit for translation and decoding of Manchester signals which requires no adjustable components, and yet decodes Manchester signals having considerable variation of distortion in a reliable and consistent manner. The circuit also is economical to produce since the number of components is minimized and relatively small.

SUMMARY OF THE INVENTION

In general the invention is a method and means for decoding a Manchester coded signal to an NRZ coded signal comprising means for sensing the direction of base line crossing of the Manchester coded signal at times central of its bit periods, and means for establishing the beginning or end of an NRZ signal pulse depending on the direction of the aforenoted base line crossing.

More particularly, the inventive means for decoding a Manchester coded signal to an NRZ coded signal is comprised of means for receiving the Manchester coded signal, means for generating output pulses, each of the pulses starting when the generating means is enabled and ending when the generating means is disabled, means for enabling the generating means upon reception of a first base line crossing of the Manchester coded signal in a predetermined direction a predetermined time after the beginning of a bit period, means for determining the direction of the base line crossing of the Manchester coded signal at a time following said first base line crossing in excess of ½ of a bit period, and means for further enabling of the generating means in the event the determined direction of the base line crossing is the same as said first base line crossing and for disabling the generating means in the event the determined direction of the base line crossing is opposite to that of the first base line crossing.

Since the constitution of the resulting NRZ encoded signal is dependent not on the wave shape of the Manchester coded signal but only on the direction of the zero or base line crossing of the Manchester coded pulse at a central time or half way through its time period, distortions in the Manchester pulse wave shape such as excessive rise and fall time or a degree of ringing do not affect the output signal.

INTRODUCTION TO THE DRAWINGS

A better understanding of the invention will be obtained by reference to the detailed description below, and to the following drawings, in which.

DETAILED DESCRIPTION OF THE INVENTION

Figure 1:
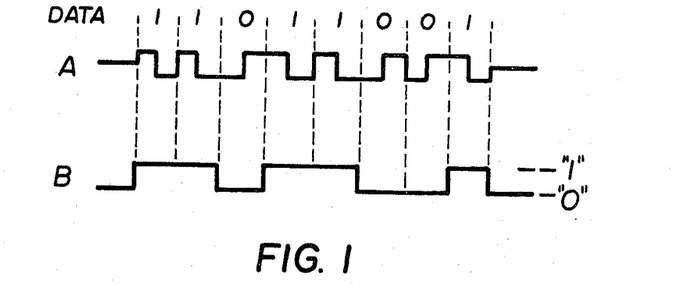
FIG. 1 shows a pair of waveforms, waveform A being an example of a Manchester coded signal, and waveform B being the equivalent NRZ coded signal.

Turning first to FIG. 1, two waveforms A and B are shown. Individual bit periods are demarcated by vertical dashed lines, between which, is shown the data in binary code represented by each bit period of the signal.

Wave form A is a Manchester coded signal depicting in each bit period the binary code immediately above. It may be seen that to signify a binary "1", the signal level is high for the first half of the bit period. To signify a "0" the signal level is high during the second half of the bit period. The longest period of constant signal therefore is equal to one full bit period during a transition of a "1" to a "0" or vice versa.

Waveform B, depicts the equivalent NRZ signal. In this case the signal is high level for the entire bit period whenever it is to signify a "1", and low level for the entire bit period when it is to signify a "0". It may be seen that for long strings of "1"s or "0"s, a near-DC response for an NRZ signal translation circuit is required since the signal level is constant for long periods of time. Accordingly for certain systems where a D.C. response is impractical, a Manchester coded signal is used.

The present invention is a circuit for the decoding of the Manchester signal of the type of waveform A in FIG. 1, into an equivalent NRZ signal of the form of waveform B.

Figure 2A:
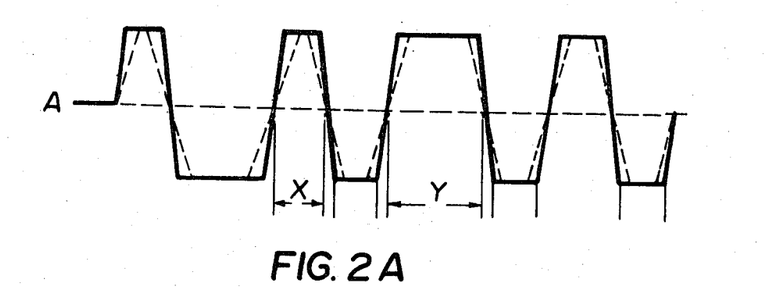
FIGS. 2A and 2B show examples of Manchester coded signals with two forms of distortion.
Figure 2B:
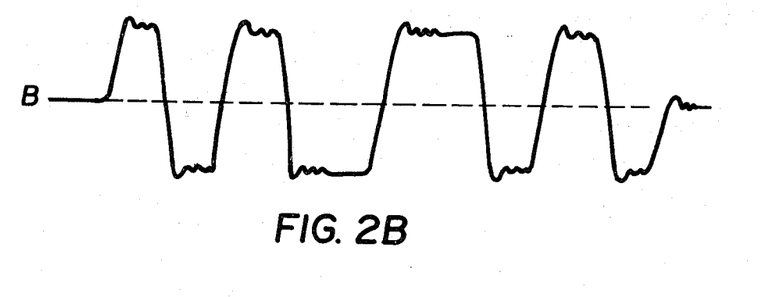

A Manchester coded signal showing one form of distortion is depicted in the waveform of FIG. 2A and another type of distortion is depicted in the waveform of FIG. 2B. The waveform of FIG. 2A shows the Manchester type signal when translated by circuitry having a poor high frequency response. The applied signal is shown in solid line, and the resulting distorted signal is shown in dashed line. Upon the applied signal being translated by circuitry having a poor high frequency response, the rise and fall times of the various pulses of the signal become longer, decreasing the slopes of the leading and trailing edges.

Due to the variation of Manchester code generation equipment and introduced distortions the bit periods of a single bit, as measured between successive base line or zero crossings of the signal are often found to vary between 60 and 105 nanoseconds (shown as period "X" in FIG. 2A). Similarly, the time between the zero crossings of a long pulse, such as that encountered when a transition occurs from a "1" to a "0" or vice versa, are often found to vary between 145 and 190 nanoseconds (shown as period "Y") in FIG. 2A. The period during which one can reliably distinguish between a short and a long pulse occurs between 105 and 145 nanoseconds. It should be noted that with a 160 nanosecond bit length six cycles of a signal from a 53 megahertz oscillator fall within the period of the noted reliable period during which a measurement can be taken, i.e., 114 nanoseconds. Seven cycles of the 53 megahertz signal also falls within this period, i.e. 133 nanoseconds. This factor will be noted in more detail below.

The waveform of FIG. 2B shows another form of distortion. In this case ringing has been impressed on the pulse signal by one of the translation stages carrying the signal. The waveform of FIG. 2B also depicts other distortion introduced i.e. long rise and fall times of the various pulses of the signal, as well as ringing.

As noted earlier, the present circuit is virtually immune to the distortions of ringing, long rise and fall times of individual pulses, and variations in the bit periods of the short time period pulses of between 60 and 105 nanoseconds, and variations of the long bit periods of between 145 and 190 nanoseconds.

The present invention utilizes the direction of the zero or baseline crossing of each pulse central of or at the middle of each bit period to establish whether each bit represents a "1" or a "0". Returning to waveform A of FIG. 1, central of the first bit period the base line crossing (considering it to be at the amplitude midpoint of each pulse), moves negatively, signifying a "1". The signal central of the second bit period similarly moves negatively, but the signal central of the bit period of the third bit moves positively, signifying a "0". The circuit of this present case, the Manchester signal is shown in a period of transition between a "1" and a "0", and therefore no zero or base line crossing of the Manchester coded signal occurs during the six pulse count. The following zero or base line crossing occurs after the end of the last six pulse count, but this time is in the positive direction. Accordingly the circuitry decodes this zero or base line crossing as signifying the presence of a "0" bit.

Figure 3:
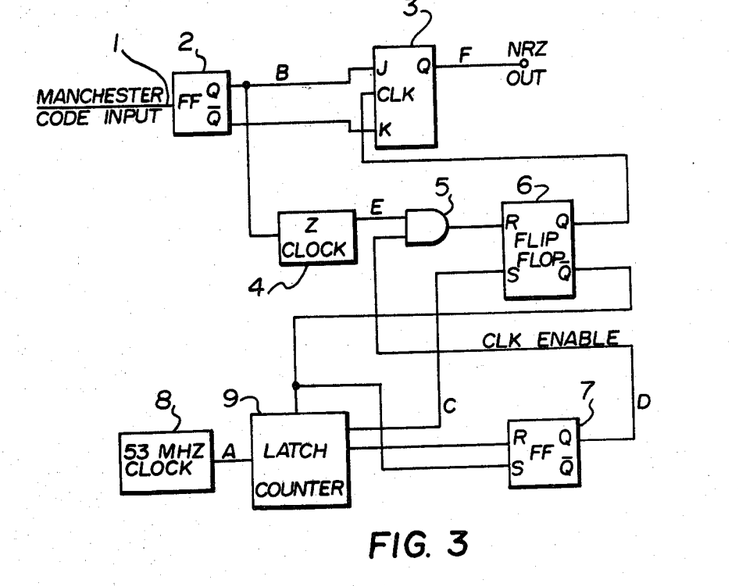
FIG. 3 is a block diagram of the invention in basic form.

Turning now to FIG. 3, a block diagram is shown for decoding the Manchester coded signal to an NRZ coded signal.

A signal of Manchester code form is received at input 1 of flip flop 2. The $\overline{Q}$ output signal of flip flop 2 is applied to the J input of J-K flip flop 3, while the Q output is applied to the K input of J-K flip flop 3. Accordingly, whenever the Manchester signal is at high level, an input is applied to the J input of flip flop 3, and when the Manchester signal is at low level, an input is applied to K input of flip flop 3 from flip flop 2.

The Q output of flip flop 2 also is applied to the input of a Z clock generation circuit 4. The Z clock generation circuit provides a short positive output pulse, each following a transition through zero of the Manchester coded signal. The Z clock output signal is shown as waveform E in FIG. 4.

The Z clock output signal is applied through AND gate 5 to the R input of flip flop 6. The other input of AND gate 5, labelled CLK ENABLE is connected to the output of flip flop 7. The Q output of flip flop 6 is connected the clock input (CLK) of flip-flop 3. The output of flip flop 3, labelled NRZ, carries the decoded signal output.

A 53 megahertz pulse signal oscillator, clock 8 has its output connected to the input of serial counter 9, which has its output of a half bit period count to the R input of flip flop 7. The $\overline{Q}$ output of flip flop 6 is connected to the latch input of counter 9, as well as to the S input of flip flop 7. A-six-pulse count output of counter 9, (waveform C, FIG. 4) is connected to the s input of flip flop 6.

In operation, the 53 megahertz clock provides a pulse signal to the signal input of counter 9. Counter 9 applies an output signal to flip flop 7 to drive it in such a manner that its output goes to high signal level during the second and third quarters of the Manchester code pulse period and to low level for the first and fourth quarters. The output signal of flip flop 7 is shown as waveform D in FIG. 4. This output signal, appears on the CLK ENABLE lead and is applied to the input of AND gate 5.

Figure 4:
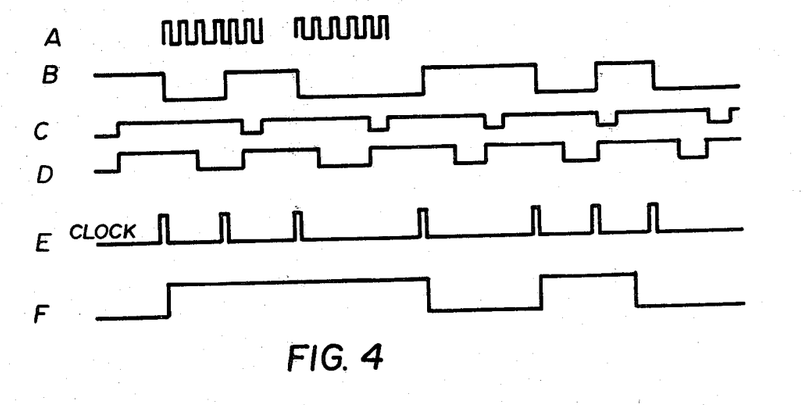
FIG. 4 shows a group of waveforms in explanation of the block diagram of FIG. 3, FIGS. 5 and 6 taken together show a detailed schematic of the invention.

The Manchester coded input signal, in the meantime, has been applied to flip flop 2 and when the output signal at its Q output is applied to Z clock circuit 4, pulses of waveform E are generated at each transition through the base line or zero crossing. These pulses are applied to the second input of AND gate 5.

Upon examination of wave forms D and E of FIG. 4, it will be noted that a pulse corresponding to each Manchester code zero crossing as obtained from the output of the Z clock occurs somewhere central of each pulse of wave form D, either during its high or low level period. The Z clock pulses are gated through AND gate 5 only during the periods of the high level of wave form D. The resulting output of AND gate 5 is applied to R input of flip flop 6. The Q output of flip flop 6 is applied as a clock signal to flip flop 3.

It should be noted that the first transition of the Manchester code base line or zero crossing has generated the first Z clock pulse, which meets a high level input signal in AND gate 5, causing flip flop 6 to remove the previous signal at its $\overline{Q}$ output which had been applied to the latch input of counter 9. This allows counter 9 to begin counting input pulses from clock 8. At the same time the latch signal is removed from the S input of flip flop 7, allowing it to time and eventually change its output to low level.

After counter 9 has counted six 53 MHz clock pulses, an output appears which is applied to the S input of flip flop 6. This causes its $\overline{Q}$ output to go to low level. This low level stops counter 9 from further counting and is also applied to the S input of flip flop 7, the CLK ENABLE output of flip flop 7 goes to high level and is applied to AND gate 5 which itself awaits the next Z clock input pulse.

Once the Z clock pulse has arrived during the period of a high level signal on the CLK ENABLE lead input to AND gate 5, flip flop 6 changes its output polarity, removing the latch input from counter 9, and applying a signal to the clock input of flip flop 3. This allows counter 9 to begin counting six pulses again from zero. After counting two pulses an output from counter 9 is applied to the R input of flip flop 7, the CLK ENABLE output of flip flop 7 applies a low to an input of AND gate 5 preventing it from responding to any Z clock pulses. when counter 9 counts six pulses the sequence repeats itself. This sequence continues as long as the Manchester transmission lasts.

It should be noted that pulses appear from flip flop 6 at the clock input of flip flop 3 only during the time of the zero or base line crossing transitions of the Manchester coded signal which are central of the Manchester coded signal bit period. Counting of the six pulses from clock 8 is initiated at the same time. The condition of the Manchester code signal at the end (or the beginning) of each bit period is ignored, since this transition occurs during the period of the counting of the six pulses. The end of the six pulse count initiates the high signal level period on the CLK ENABLE lead to gate 5, during which time gate 5 awaits coincidence with a Z clock pulse which signifies a Manchester code zero or base line transition. Accordingly it may be seen that the zero or base line crossing transition of the Manchester signal (B) at the first Z clock pulse (E) in FIG. 4 is sensed, but the second, which occurs during the six pulse count period, is ignored. The third transition period is sensed, but the end of the last-noted bit period contains no transition during the six pulse count period. The following zero or base line crossing which occurs coincident with the fourth Z clock pulse in FIG. 4, which is sensed, moves in the positive, or opposite direction. Accordingly this signifies the beginning of a "0" in NRZ code.

With the coincidence with the first Z clock pulse with a transition of the Manchester code sensed in the negative direction, (see wave form B of FIG. 4), and with a pulse at the clock input of flip flop 3 resulting from coincidence of input signals to AND gate 5, the output of flip flop 3 goes to high level, since the input signal to the J input of clock 3 was at high level due to translation of the Manchester signal in flip flop 2.

At the time of the following clock pulse input to flip flop 3 from flip flop 6, coincident with the next sensed negative going transition of the Manchester signal (see waveform B of FIG. 4), the Manchester input signal to the J input of flip flop 3 is still at high level. Accordingly the NRZ output of flip flop 3 remains at high level. It should be noted that the second Z clock pulse was not coincident with a high level signal on the CLK ENABLE lead and therefore did not generate a clock input pulse to flip flop 3.

However the fourth Z clock pulse is coincident with the clock enable pulse, and causes generation in flip flop 6 of a clock pulse which is applied to flip flop 3. At this time, however, the input signal to the K input of flip flop 3 is at high level, and the input signal to the J input is at low level. Accordingly the NRZ output signal changes to low level. Following the coincidence of the Z clock, CLK ENABLE and Manchester code waveforms respectively E, D and B of FIG. 4, one can observe coincidence, translation and generation of output signal F, which is the NRZ decoded signal from the input Manchester code.

Looking briefly at waveforms B and D of FIG. 4, it will be noted that the signal signifies data comprising two "1" bits followed by a "0" bit.

Waveform F, the decoded NRZ output signal which also starts with two "1" bits followed by a "0" bit, is shifted and lags in phase by one half of a Manchester code bit period plus the period of a Z clock pulse.

The low to high transitions on the CLK ENABLE line occur approximately in the middle of each NRZ OUTPUT data bit and therefore this line is the "decoded clock" from the Manchester signal and will be used as the synchronizing clock to mach the NRZ data into all peripheral circuitry where the data will be used.

It should be noted that since the circuit operates only upon the sensing of a single zero or base line transition central of the bit period of each Manchester code signal bit, it is substantially immune to the ringing and timing variations of distorted Manchester coded signal pulses described earlier.

Figure 5:
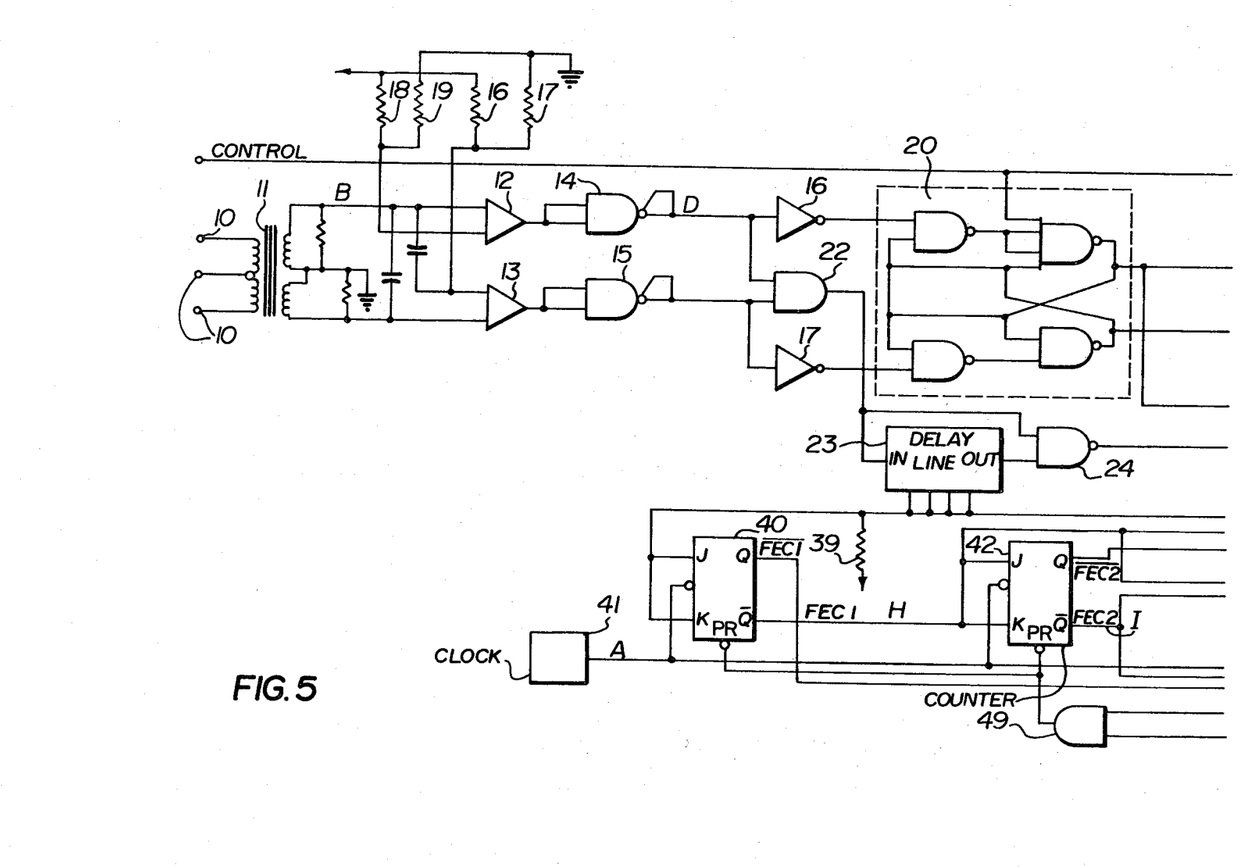
Figure 6:
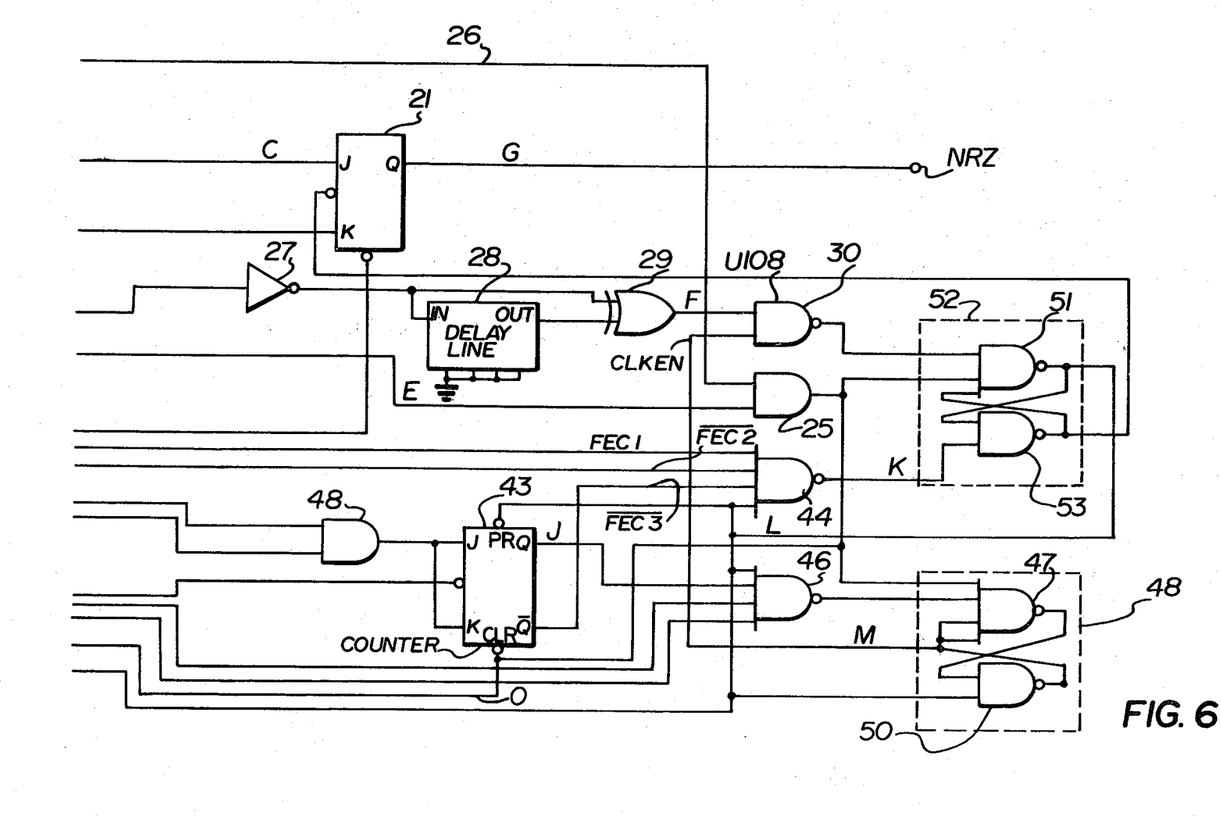

Turning now to FIGS. 5 and 6, a detailed schematic of the invention is shown. The circled letters refer to the similarly labelled waveforms of FIG. 7. Input terminals 10 carry the Manchester signal to primary windings of transformer 11. Its secondary windings are connected to opposite polarity inputs of operational amplifiers 12 and 13 respectively, the outputs of which are connected through individual inverters 14 and 15. The other terminals of operational amplifiers 12 and 13 are respectively connected to taps of individual voltage dividers which are each connected between a source of potential +V and ground. One voltage divider is comprised of series resistors 16 and 17, and the other voltage divider is comprised of series resistors 18 and 19. Inverters 14 and 15 are individually connected through inverters 16 and 17 respectively to the individual inputs of latch 20. The output terminals are respectively connected to the J and K inputs of J-K flip flop 21, which has its Q output connected to output terminal NRZ.

The outputs of inverters 14 and 15 are also connected to the individual inputs of AND gate 22, the output of which is connected to both the input of delay line 23, and one input of NAND gate 24. The output of delay line 23 is also connected to the other input of NAND gate 24.

The output of NAND gate 24 is connected to one input of AND 25, the other input of which is connected to control lead 26. Control lead 26 is used to shut off the decoder when information is being transmitted back out on the Manchester line.

The output of latch 20 which is connected to the J input of flip flop 21 is also connected to inverter 27, the output of which is connected to the input of delay line 28 and also to one input of EXCLUSIVE OR gate 29. The output of delay line 28 is connected to the second input of EXCLUSIVE OR gate 29. The output of EXCLUSIVE OR gate 29 is connected to one input of NAND gate 30.

A 53 megahertz pulse signal oscillator 41 has its output connected to the clock inputs of three flip flops, 40, 42, and 43. The $\overline{Q}$ output of flip flop 40 is connected to the J and K inputs of flip flop 42, as well as to the FEC 1 input of NAND gate 44, and to one input of AND gate 48. The $\overline{Q}$ output of flip flop 42 is connected to the other input of AND gate 48, which has its output connected to the J and K inputs of flip flop 43. The Q output of flip flop 42 is connected to the $\overline{FEC2}$ input of NAND gate 44. The $\overline{Q}$ output of flip flop 43 is connected to the $\overline{FEC3}$ input of AND gate 44, and the PR input of flip flop 43 is connected to the fourth input of AND gate 44.

The Q output of flip flop 43 is connected to the FEC3 input of NAND gate 46. The output of AND gate 25 is connected to one input of multiple input NAND gate 47 which comprises a portion of latch 48. The output of NAND gate 46 is connected to a second input of the multiple input NAND gate 47.

The output of AND gate 25 is also connected to the clear input of flip flop 43 and to one input of AND gate 49. The PR input of flip flop 43 is connected to a second input of multiple input NAND gate 46, to the second input of AND gate 49, and to the input of NAND gate 50 which comprises latch 48 with NAND gate 47. The output of AND gate 49 is connected to the PR inputs of flip flops 40 and 42.

The $\overline{FEC1}$ output of flip flop 40 is connected to a third input of AND gate 46, and the $\overline{Q}$ output of flip flop 42 which is connected to the second input of AND gate 48 is connected to the fourth input of NAND gate 46.

The output of NAND gate 30 is connected to one input of multiple input NAND gate 51 which comprises a portion of latch 52. The output of AND gate 25 is connected to the second input of NAND gate 51, while the output of NAND gate 44 is connected to the input of NAND gate 53 which comprises the remaining portion of latch 52. One output of latch 52 is connected to the PR input of flip flop 43 via a CLK LATCH lead. The other output of latch 52 is connected to the clock input of flip flop 21.

The operation of the above-described circuit is as follows, with reference to the waveforms shown in FIG. 7. A Manchester coded signal appears at input terminals 10 of transformer 11, reappears on the secondary of transformer 11, and is for example, of the form of waveform B. Control lead 26 provides means for shutting down the receiver/decoder when data is being transmitted onto the Manchester lines via another winding on the transformer (not shown.

After translation in transformer 11 which isolates the circuit from the input lines, operational amplifiers 12 and 13, which act as threshold controlled differential amplifiers (with their individual thresholds being controlled by the voltage at the tap of the voltage dividers comprising resistors 16 and 17, and 18 and 19), amplify the signal exceeding a noise threshold amplitude in push pull, each amplifier translating opposite polarity excursions of the signal. The output of one of these amplifiers can be seen as waveform D. The signal is further translated through inverters 16 and 17 and are applied to the inputs of latch 20. The outputs of latch 20 carry the respective positive and negative excursion signals to the individual J and K inputs of flip flop 21 (see waveform C). The effect of latch 20 is to act as a Schmitt trigger, thereby to remove ringing and other noise distortion and the like from the Manchester code signal, whereby reasonably clean pulse signals are applied to the inputs of J and K flip flop 21.

Upon receipt of Manchester coded signals from the outputs of inverters 14 and 15 AND gate 22 generates an input signal which is applied to one of the inputs of NAND gate 24. After a short delay in delay line 23, the output signal from AND gate 22 is applied to the second input of NAND gate 24. Therefore an output signal appears from NAND gate 24 as long as there is either a positive or negative excursion of the Manchester coded signal exceeding the period of the delay. The purpose of the delay is to insure that the signal which has been received exceeds a predetermined period which is longer than typical noise pulses which may appear on the input lines. The output of NAND gate 24 therefore goes to high level as long as a Manchester signal is present, after a short delay, and is of the form of waveform E in FIG. 7.

The signal at the output of latch 20 which is connected to the J input of flip flop 21 is applied through inverter 27 to one input of EXCLUSIVE OR gate 29. This signal is also applied via delay line 28 to the second input of EXCLUSIVE OR gate 29. Accordingly at the initiation of a positive going excursion of the Manchester coded signal, an output is provided from EXCLUSIVE OR gate 29. However once a delayed version of the same signal is applied to the second input of EXCLUSIVE OR gate 29, the output of that gate drops to low level.

Similarly, when the Manchester coded signal drops to low level, the first input of exclusive OR gate 29 drops to low level, and with the delayed remainder of the high level signal passing through delay line 28, an output signal from EXCLUSIVE OR gate 29 is produced, until the delayed signal drops to low level.

The effect therefore is to produce a pulse from EXCLUSIVE OR gate 29 each time a zero or base line crossing transition of the Manchester signal occurs, whether it be positive or negative going. This signal is here referred to as the Z clock signal, shown as waveform F of FIG. 7. The Z clock pulses are applied to one input of NAND gate 30. The Z clock signal is gated through NAND gate 30 only at specific times which will be discussed in more detail below.

The 53 megahertz pulse oscillator 41 provides a clock input signal to flip flops 40, 42 and 43, which flip flops act as counters. The outputs of flip flops 42 and 43 are connected to NAND gate 44, counting successively through a count of 6. The individual signals are shown in waveforms FEC1, FEC2, and FEC3, in FIG. 7. The FEC1, FEC2, and FEC3 signals as well as the output signal of latch 52 are applied to NAND gate 46, which applies its signal to one input of latch 48.

Upon a first clock count from flip flop 40, on the FEC1 lead, latch 48 is set so as to provide a high level output signal on its CLK ENABLE lead. After a period of time equivalent to ½ the bit period of the Manchester signal, the output of latch 48 tunes out and reverts to low level. In the meantime, the counters comprising flip flops 40, 42 and 43 count the oscillator 41 output pulses, and at a time prior to the completion of a Manchester coded signal bit period, go to low level in sychronism with the short high level period of the FEC2 lead (waveform I). This signal is applied to latch 48, which recovers its low level signal to high level. This sequence is recycled repeatedly. The effect on the CLK ENABLE lead is to provide a high level output signal about 90° out of phase with the bit period of the Manchester signal (see waveform M).

The signal on the CLK ENABLE lead is applied to the second input of NAND gate 30. Accordingly Z clock pulses are gated through NAND gate 30 only during the high level output portions of the signal on the CLK ENABLE lead. Since the high level portion of the signal on the CLK ENABLE lead appears only during the 90° phase period both preceeding and following the middle of the bit period time, Z gate pulse only appear at the output of gate 30 at the mid-bit period transition time of the Manchester signal.

The output signal from NAND gate 30 is applied to one input of latch 52, which is only activated upon the coincidence of the high level signal appearing from the output of NAND gate 24, which is at high level during the entire period of the Manchester signal (with a short initial delay), and the high portion of the signal on control lead 26, which is high only when the decoder is being used.

It should be noted that initially the output of latch 52 which is connected to the clock input of flip flop 21 is at low level. Further, a low level output appears on the RR1 (waveform O) lead, which disables the counters from counting.

Upon reception of the first Manchester code the transmission line goes high removing the low level signal on the RR1 lead and flip flops 40, 42 and 43 start counting. A count "1", the CLK LATCH line goes low and the CLK ENABLE lines goes high. At this time the flip flops 40, 42 and 43 count goes to "4" and counting is inhibited. Since the CLOCK ENABLE signal is high, next z clock pulse is gated through NAND gate 30 and is applied to latch 52, causing its output to reverse polarity. Accordingly the CLOCK LATCH signal is removed from the counters, and the counters begin counting to six pulses, "4", "5", "6", "7", "0", and "1". In the meantime the clock input to flip flop 21 goes to high level, allowing the signal applied to the J input thereof to be applied to its NRZ terminal.

Figure 7:
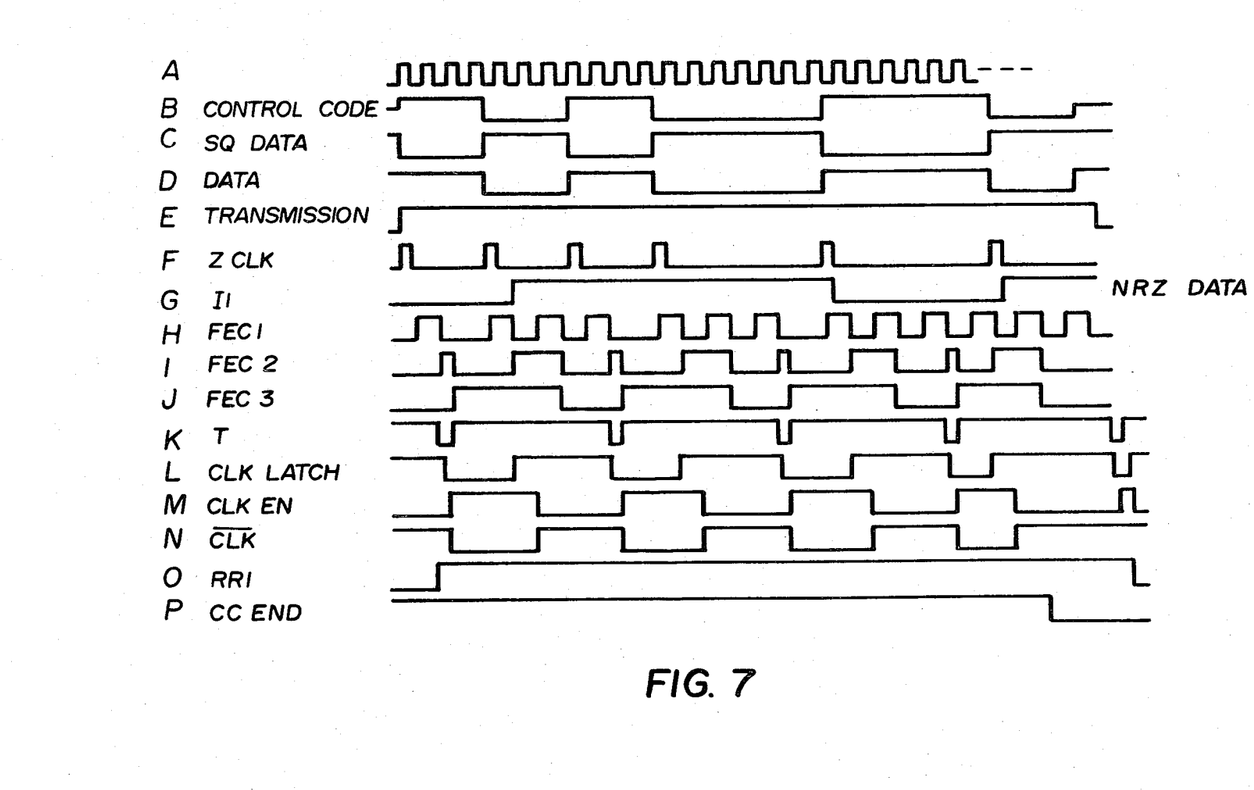
FIG. 7 shows a group of waveforms in explanation of the operation of the schematic diagram of FIGS. 5 and 6.

In the case shown in FIG. 7, for example, the transition of a Manchester code (waveform C) results in a high level second half of the bit period. Due to the respective polarities of the signals applied to flip flop 21, a high level output signal appears from the Q output of flip flop 21 is applied output terminal NRZ.

As the counters count through six pulses, which extend in time past the end of the first bit period and to a time extending so as to avoid time distortion variations of the Manchester coded signal, a signal is gated through NAND gate 44 and is applied to latch 52. This causes reversal of the polarities of the output leads, causing the CLOCK LATCH output signal to stop the counting of the counters as described earlier. During the interval of the count of six pulses, as described earlier, because of the action of NAND gate 46 flip flop 48 has been caused to provide a low level signal on the CLK ENABLE lead to NAND gate 30, which bars gating of the Z clock pulses from passing therethrough. Accordingly zero or base line crossing translations of the Manchester code signal are ignored during that period.

Following termination of the six pulse count, the clock enable signal on the CLK ENABLE lead is returned to high level due to operation of latch 48. Accordingly during this interval the reception of a Z clock pulse which is caused by the next zero or base line crossing of the Manchester coded signal causes gating of NAND gate 30 and operation of latch 52, thus reversing the polarity of its output signal. Accordingly flip flop 21 is clocked, and the counters are also enabled once again and begin counting six pulses as before.

Waveform G of FIG. 7 shows the output signal at terminal NRZ connected to the output of flop flop 21. It should be noted that the base line or zero crossing of Manchester coded signal (B in FIG. 7) at the time of the third Z clock pulse is in the same direction as at the time of the first Z clock pulse. Accordingly the output signal from flip flop 21 remains at high level; the decoding circuitry has thus decoded two successive "1's".

The coincidence of the Z clock pulse with the next high level signal on the CLK ENABLE lead occurs at the time of a positive-going crossing of the base line or zero level by the Manchester signal. Since the SQ DATA signal waveform C at the time of this coincidence is at low level, due to the polarity of the signals applied to flip flop 21, the output signal therefrom applied to the NRZ terminal goes to low level. The apparatus has thus decoded "0".

It may thus be seen that this system and circuit accurately decodes Manchester code signals to NRZ code signals without the requirement for adjustable components or the like. The circuitry is relatively simple, avoids detection of the Manchester code at signal amplitude where distortion might occur, and further avoids detection of the Manchester code with a dependence on the rise and fall characteristics of each pulse.

A person skilled in the art understanding this invention may now conceive of other embodiments, or variations, using the same or similar principals of this invention. All are considered within the sphere and scope of the present invention as defined in the claims appended hereto.

I claim:
1. Means for decoding a Manchester coded signal to an NRZ coded signal comprising:
 (a) means for receiving said Manchester signal,
 (b) means for generating output pulses, each of said pulses starting when the generating means is enabled and ending when the generating means is disabled,
 (c) means for providing a timing pulse signal having a bit period which is similar to that of the Manchester coded signal, but out of phase by about 90 degrees,
 (d) means for providing a clock pulse with each baseline crossing of the Manchester coded signal,
 (e) means for sensing of the direction of the crossing of the baseline upon the coincidence of the clock pulse and a predetermined polarity of the timing pulse signal,
 (f) means for timing an interval following each sensed baseline crossing of the Manchester coded signal, which interval is greater than one-half of a bit period,
 (g) means for enabling of the generating means upon each said sensing which is outside said time interval and in the event the sensed direction of the baseline crossing is the same as the first baseline crossing, and for disabling the generating means upon each said sensing which is outside said time interval and in the event the sensed direction of the baseline crossing is opposite to that of said first baseline crossing to provide an NRZ coded signal at the output of the generating means.

2. Means for decoding a Manchester coded signal to an NRZ coded signal as defined in claim 1, in which the means for timing an interval is comprised of a master clock and means for counting a predetermined number of master clock pulses for establishing said time interval.

3. Means for decoding a Manchester coded signal to an NRZ coded signal comprising:
 (a) means for receiving a Manchester coded signal,
 (b) a J-K flip flop for receiving opposite polarities of said signal at its J and K inputs respectively, and having a clock input terminal,
 (c) means for generating a first clock pulse each time the Manchester coded signal crosses a baseline,
 (d) a master clock signal source,
 (e) means for deriving a signal from the master clock signal source having a bit period similar to that of the Manchester coded signal, but out of phase by about 90 degrees,
 (f) means for sensing the coincidence of said first clock pulses with a predetermined polarity of said derived signal, and for generating second clock pulses with each said coincidence,
 (g) a counter having an enable input for counting pulses from the master clock signal source over a time interval in excess of one-half of a Manchester coded signal bit period but less than a full bit period once enabled and generating a time interval signal,
 (h) means for receiving said said time interval signal and said second clock pulses and generating third clock pulses related to said second clock pulses occurring outside said time interval and applying them to the clock input of the J-K flip flop, and for enabling the counter to initiate said time interval, whereby an output signal of said flip flop is generated in the form of said NRZ coded signal.

4. Means for decoding a Manchester coded signal to an NRZ coded signal comprising:
   (a) means for receiving a Manchester coded signal,
   (b) a J-K flip flop for receiving opposite polarities of said signal at its J and K inputs respectively, having a clock input terminal,
   (c) means for generating a first clock pulse each time the Manchester coded signal crosses a baseline,
   (d) a master clock signal source,
   (e) first counter means for deriving a signal from the master clock signal source having a bit period similar to that of the Manchester coded signal, but out of phase by about 90 degrees,
   (f) an AND gate for receiving said first clock pulses and a predetermined polarity of said derived signal, for providing second clock pulses at its output,
   (g) second counter means having an enable input for counting pulses from the master clock signal source over a time interval in excess of one half of a Manchester coded signal bit period but less than a full bit period once enabled and for generating a time interval signal,
   (h) a second flip flop for receiving said time interval signal realting to said time interval and said second clock pulses and generating third clock pulses related to said second clock pulses occurring outside said time interval and for applying them to the clock input of the J-K flip flop, and for applying them to the enable input of the second counter means to initiate said time interval,
   whereby an output signal of said flip flop is generated of the form of said NRZ coded signal.

5. Means for decoding a Manchester coded signal to an NRZ coded signal comprising:
   (a) a master clock for providing master clock pulses,
   (b) means for deriving a timing pulse signal from the master clock pulses having a bit period which is similar to that of the Manchester coded signal, but out of phase by about 90 degrees, and having a predetermined polarity which overlaps the significant signal transitions,
   (c) means for counting a predetermined number of master clock pulses for establishing an interval of time in excess of one-half of a bit period but less than a full bit period,
   (d) means for establishing said interval of time following each significant baseline crossing of the Manchester coded signal,
   (e) means for sensing the direction of any baseline crossing of the Manchester coded signal during said predetermined polarity of said timing pulse signal to establish said significant baseline crossing and for ignoring the direction of any baseline crossing of the Manchester coded signal during said interval of time, and
   (f) means for establishing the beginning or end of an NRZ signal pulse depending on the direction of said sensed significant baseline crossing of the Manchester coded signal during coincidence thereof with said predetermined polarity of said timing pulse signal which is outside the duration of said interval of time following each said sensed baseline crossings.

* * * * *